Sept. 21, 1943.  A. R. THOMAS  2,329,863
REFRIGERATION
Filed Jan. 4, 1940
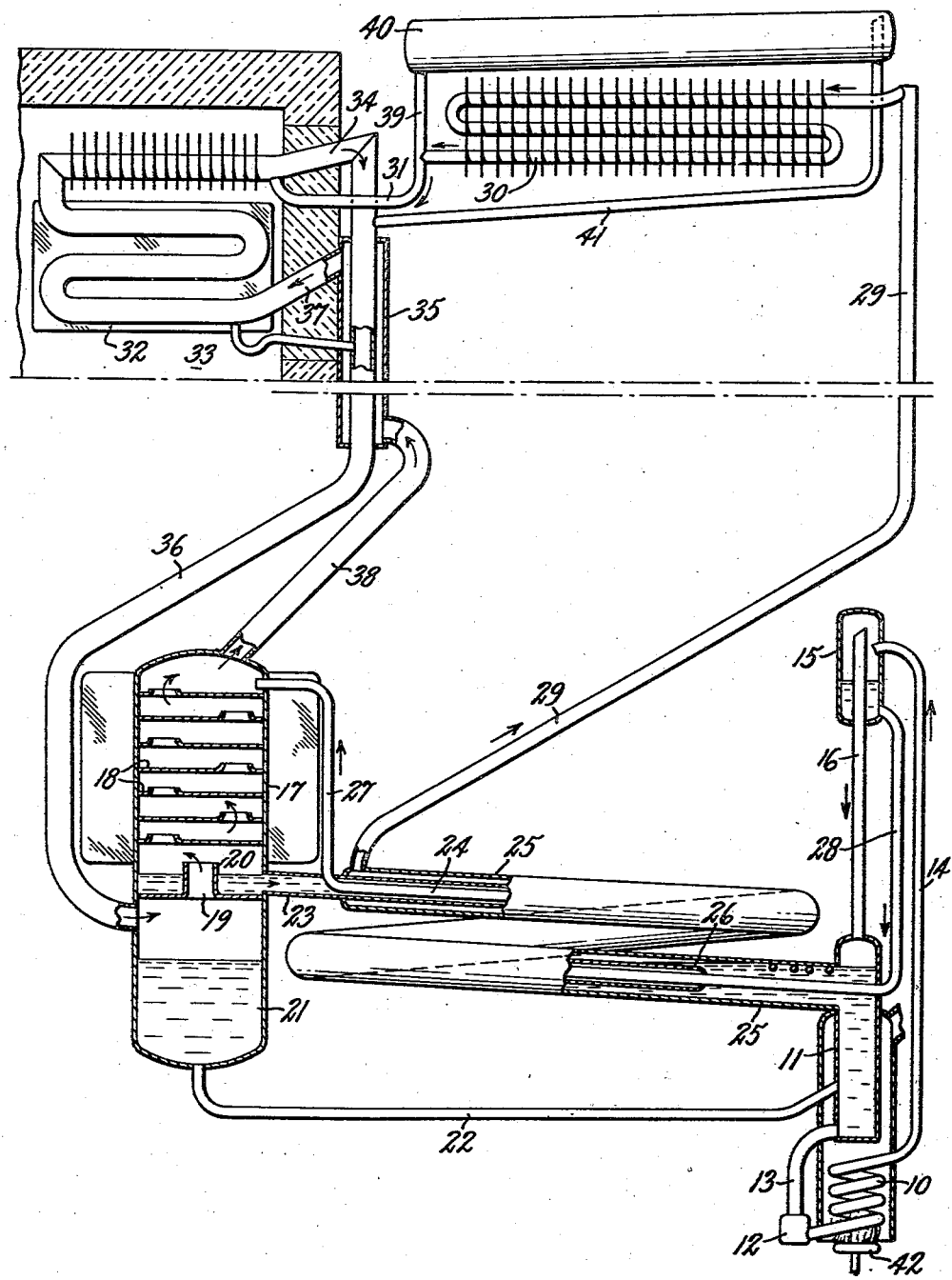
INVENTOR.
Albert R. Thomas
BY
L. E. Heath
his ATTORNEY.

Patented Sept. 21, 1943

2,329,863

UNITED STATES PATENT OFFICE 2,329,863

REFRIGERATION

Albert R. Thomas, Evansville, Ind., assignor to Servel, Inc., New York, N. Y., a corporation of Delaware Application January 4, 1940, Serial No. 312,315

7 Claims. (Cl. 62—119.5)

My invention relates to refrigeration, and more particularly to refrigeration systems making use of evaporation of refrigerant fluid in the presence of an auxiliary inert fluid.

It is an object of the invention to provide a refrigeration system of this type having high efficiency during usual operation and having increasing capacity under high load conditions.

The drawing shows more or less diagrammatically a refrigeration system embodying the invention. In this system, a generator includes a coil 10 and a vessel 11. The bottom of vessel 11 is connected to the lower end of coil 10. The lower end of coil 10 is connected to a surge chamber 12, and the latter is connected by a conduit 13 to the bottom of vessel 11. The upper end of coil 10 is connected by a conduit 14 to a gas and liquid separating vessel 15. The upper part of vessel 15 is connected to the top of generator vessel 11 by a conduit 16.

An absorber 17 is shown as a vessel provided with liquid spreading baffle plates 18. The bottom of the absorber 17 has an opening 19 surrounded by an upstanding ledge 20. Below the absorber is a vessel 21. The top of vessel 21 communicates with the absorber 17 through opening 19. The bottom of vessel 21 is connected by a conduit 22 to the generator vessel 11.

The bottom of absorber 17 is connected to a conduit 23 which is located concentrically around a tube 24, and also concentrically within a tube 25. The pipes 23, 24, and 25 form a three-passage heat exchanger and are formed into a coil. The other end of conduit 23 is closed. At the top of the closed end of conduit 23 is a small opening or orifice 26. The inner tube 24 is connected at one end by a conduit 27 to the upper part of absorber 17. The other end of inner tube 24 is connected by a conduit 28 to the lower part of separating vessel 15. The lower end of outer tube 25 is connected to the upper part of generator vessel 11. The other end of tube 25 is connected by a conduit 29 to a condenser 30.

Condenser 30 is connected by a conduit 31 to the upper part of an evaporator 32. Evaporator 32 is located in a refrigerator storage compartment 33. The upper end of evaporator 32 is connected by a conduit 34, a gas heat exchanger 35, and a conduit 36 to the upper part of vessel 21. The lower end of evaporator 32 is connected by a conduit 37, gas heat exchanger 35, and a conduit 38 to the top of absorber 17.

The outlet end of condenser 30 is connected by a conduit 39 to a vessel 40. The other end of vessel 40 is connected by a conduit 41 to the circuit which includes evaporator 32.

The generator coil 10 and vessel 11 are heated by any suitable means such as a gas burner 42. Condenser 30 is provided with fins for air cooling, but, as known, may be cooled by water or intermediate heat transfer system. Absorber 17 is provided with fins for air cooling but, as known, may be water cooled or cooled by an intermediate heat transfer system.

The system is hermetically sealed and contains a refrigerant fluid, an absorbent therefor, and an auxiliary inert fluid. Ammonia, water, and hydrogen may be used. The ammonia and water are introduced as a solution, and the hydrogen is introduced before sealing of the system and at a pressure such that the total pressure in the system will be the condensing temperature of ammonia at a high room temperature.

In operation, burner 42 is lighted. Heat from the burner heats solution in coil 10 and, at a lower temperature, in vessel 11. Heating of the solution causes expulsion of ammonia vapor. Vapor formed in coil 10 rises through the coil and through conduit 14 into separating vessel 15. The gas becomes trapped in liquid in coil 10 and conduit 14 so that a rising column of gas and liquid extends upward through conduit 14 and overflows the upper end of this conduit into vessel 15.

Vapor expelled from solution in vessel 11 rises through the liquid in this vessel. Vapor from vessel 15 flows through conduit 16 and joins vapor in the upper part of vessel 11. Vapor in the upper part of vessel 11 bubbles through liquid in the outer heat exchanger conduit 25. The level of liquid in conduit 25 is the same as the level in vessel 21 and should be about at the small opening 26 in triple heat exchanger conduit 23. Vapor leaving the surface level of liquid in pipe 25 flows on upward through this pipe in heat exchange relation with pipe 23. The vapor flows from the upper end of pipe 25 through conduit 29 to condenser 30. Vapor condenses to liquid in condenser 30. Liquid flows through conduit 31 into the upper part of evaporator 32.

Liquid flows downward in evaporator 32 in the presence of hydrogen. The liquid evaporates and diffuses into the hydrogen, producing a refrigerating effect for cooling compartment 33. The resulting mixture of ammonia vapor and hydrogen gas flows from the upper end of evaporator 32 through conduit 34, gas heat exchanger 35, and conduit 36 to vessel 21. This gas and vapor mixture, called strong or rich gas, flows through vessel 21, through opening 19, into absorber 17.

Ammonia vapor is absorbed by weak solution which flows downward in the absorber over plates 18. The hydrogen, or weak or poor gas, flows from the upper part of absorber through conduit 38, gas heat exchanger 35, and conduit 37 to the lower end of evaporator 32.

Weakened solution flows from separator 15 through conduit 28, inner heat exchanger conduit 24, and conduit 27, into the upper part of absorber 17 from whence it flows downward over plates 18 to absorb the ammonia. Enriched absorption liquid flows from the lower part of absorber 17 into conduit 23. The enriched liquid flows out of conduit 23 at the lower end through opening 26 into the lower end of conduit 25.

Vessel 40 serves to contain gas which is mostly hydrogen. Under abnormally high load conditions, uncondensed ammonia vapor from condenser 30 displaces hydrogen from vessel 40 through conduit 41 into the evaporator-absorber gas circuit so that refrigeration will continue at a higher total pressure in the system.

In gas heat exchanger 35 heat is conserved between gas flowing to and from the low temperature evaporator with respect to the higher temperature absorber. In conduits 23 and 24 of the triple heat exchanger, heat is conserved between the strong and weak solution flowing to and from the absorber with respect to the higher temperature generator. The cross-sectional area of conduit 23 around conduit 24, and the size of flow restrictor opening 26 are made so that conduit 23 will be substantially flooded at the rate at which liquid is usually caused to circulate by the vapor lift.

Vapor which flows by bubbling through liquid in the lower end of heat exchanger conduit 25 is analyzed. In the analyzer the vapor and enriched solution tend to reach equilibrium. Vapor flowing from the analyzer through the upper part of heat exchanger conduit 25 is rectified. The vapor is cooled by heat transfer to strong solution in conduit 23, causing condensation of water vapor. The condensate flows back down through conduit 25 and joins strong solution in the lower part of this conduit flowing to the generator.

Conduit 22 which connects vessel 21 to generator vessel 11 is a small diameter tube. This tube and vessel 21 form a dead-end passage for liquid. When the rate of evaporation of ammonia in evaporator 32 is low, the gas which enters vessel 21 through conduit 36 contains ammonia at a low partial pressure. Thereupon ammonia evaporates from solution in vessel 21, tending to reach equilibrium with the gas. This causes an increase in the amount of ammonia in the active part of the circuit so that the efficiency of the system working with a stronger solution in the active part is increased. Under extreme load conditions, gas entering vessel 21 through conduit 36 contains ammonia vapor at a high partial pressure so that ammonia vapor is absorbed out of the gas in the solution in vessel 21. This reduces the average concentration of solution in the active part of the system so that, as known, the capacity of the system is increased. This condition is maintained due to the fact that vessel 21 is a dead-end as far as liquid is concerned and the diffusion rate of ammonia is slow through the small pipe 22 to the generator vessel 11 in the active part of the circuit.

Various changes and modifications may be made within the scope of the invention which is limited only as indicated in the following claims.

What is claimed is:

1. An absorption refrigeration system having an evaporator and an absorber connected in a circuit for inert gas, a generator, a first conduit for conducting weak absorption liquid from said generator to said absorber, a second conduit for conducting strong absorption liquid from said absorber to said generator, the strong absorption liquid flowing by gravity in said second conduit and having two surface levels at different elevations, a third conduit for conducting generator vapor, said three conduits being in heat exchange relation at a level intermediate said liquid surface levels, and a liquid holder so connected in said gas circuit as to hold a substantially stagnant quantity of absorption liquid at a level below the upper of said surface levels and in contact with gas flowing from said evaporator to said absorber.

2. An absorption refrigeration system having an evaporator and an absorber in a circuit for inert gas, a generator, structure including a conduit providing a path of flow for absorption liquid from said absorber toward said generator, and a holder so connected in said gas circuit as to hold a substantially stagnant quantity of refrigerant absorbent in the presence of gas flowing from said evaporator to said absorber, the level of the top of said absorbent quantity being vertically spaced from the uppermost surface level of liquid in said path of flow of liquid toward said generator.

3. An absorption refrigeration system having an evaporator and an absorber in a circuit for inert gas, a generator connected with said absorber in a circuit for absorption liquid, and a storage chamber for absorption liquid so connected in said gas circuit that liquid therein contacts gas flowing from said evaporator to said absorber and so connected to said liquid circuit that liquid in the vessel is substantially stagnant and has a surface level vertically spaced from the uppermost surface level of liquid in that part of said liquid circuit in which liquid is flowing toward said generator.

4. An absorption refrigeration system having an absorber connected in both a circuit for pressure equalizing fluid and a circuit for absorption liquid, a generator in said absorption liquid circuit, a liquid flow restriction in that part of said liquid circuit in which liquid flows from said absorber downward toward said generator, such flow restriction causing liquid flowing toward said generator to have two vertically spaced liquid surface levels, a conduit for generator vapor in heat exchange with said liquid between said surface levels, and a conduit forming part of said liquid circuit for conducting absorption liquid flowing from said generator toward said absorber in heat exchange with absorption liquid flowing toward said generator between said surface levels.

5. An absorption refrigeration system having an absorber, a generator, and structure whereby absorption liquid flows from said absorber downward toward said generator in a path of flow in which the liquid has an upper liquid surface level and a lower liquid surface level, said structure including a tube forming a part of said path of flow at a region below said lower surface level and also providing a passage for conducting generator vapor in heat exchange relation and out of physical contact with liquid in said path of flow at a region between said surface levels.

6. An absorption refrigeration system having an absorber, a generator, and structure whereby absorption liquid flows from said absorber toward said generator in a path of flow in which the liquid has an upper liquid surface level and a lower liquid surface level, said structure including a plurality of conduits one within another, one of said conduits forming a part of said path of flow above said lower liquid surface level, and another of said conduits forming a part of said path of flow below said lower liquid surface level and also providing a passage for conveying generator vapors between said liquid surface levels.

7. An absorption refrigeration system having an absorber, a generator, and structure whereby absorption liquid flows from said absorber toward said generator in a path of flow in which the liquid has an upper liquid surface level and a lower liquid surface level, said structure including a pipe forming a part of said path of flow below said lower liquid surface level through which generator vapor also flows in contact with liquid, said pipe also providing a passage for generator vapor flowing out of physical contact but in heat transfer relation with liquid between said liquid surface levels.

ALBERT R. THOMAS.